April 30, 1963 B. SOLOW 3,088,085

ELECTRICAL RESISTOR

Filed Nov. 27, 1959

INVENTOR.
BENJAMIN SOLOW
BY Donald S. Cohen
ATTORNEY.

United States Patent Office 3,088,085

Patented Apr. 30, 1963

3,088,085

ELECTRICAL RESISTOR

Benjamin Solow, North Hollywood, Calif., assignor to International Resistance Company, Philadelphia, Pa.

Filed Nov. 27, 1959, Ser. No. 855,804
5 Claims. (Cl. 338—283)

The present invention relates to an electrical resistor, and more particularly to a miniaturized, film type electrical resistor.

The present trend in the electrical industry is toward miniaturized electrical components. Another trend in the electrical industry is to the use of printed circuit boards on which the electrical components are mounted. For use on the printed circuit boards, the electrical components should be as small as possible to take up as little room as possible on the board, and the terminals of the components should be arranged for ease of mounting the components on the board.

A problem in the manufacture of electrical resistors of the type comprising a film of a resistance material coated on an insulating base is to achieve a desired resistance value, and particularly high resistance values. The resistance value of a film of resistance material can be varied by varying the composition of the resistance material, the thickness of the film, and/or the length of the film. Decreasing the thickness and/or increasing the length of the film increases the resistance value. Varying the composition of the resistance film is impractical since there are not many materials which have stable electrical resistance characteristics. Varying the thickness of the film is not satisfactory alone since the thickness is difficult to control to achieve a desired value. Therefore, it has been found preferable to combine varying the length of the film along with a variation of thickness to achieve various resistance values.

Most film type electrical resistors use a cylindrical insulating base on which the resistance material is coated. The length of the resistance material is varied by cutting a spiral groove through the resistance layer to achieve a resistance path which extends helically around the base. By varying the pitch of the spiral groove, the length of the helical resistance path is varied. This also varies the width of the path which also changes the resistance value. Thus, by cutting a groove of a proper length, a resistance path of a desired resistance value can be accurately obtained.

With the trend to miniaturized components, the use of spiraling to vary the resistance value of a film type resistor has become less satisfactory. The smaller the size of the resistor, the more difficult it is to cut a fine enough spiral groove to achieve any major change in the resistance value. Also, the resistors using cylindrical bases have their terminals extending longitudinally from the ends of the base. In order for such resistors to be mounted on a printed circuit board, the terminals must be bent and shaped to be inserted into holes in the board.

It is an object of the present invention to provide a novel electrical resistor.

It is another object of the present invention to provide a novel miniaturized electrical resistor.

It is still another object of the present invention to provide a miniaturized electrical resistor the resistance value of which can be easily varied and adjusted to a predetermined close percentage tolerance.

It is a further object of the present invention to provide a miniaturized electrical resistor which can be easily mounted on a printed circuit board.

Other objects will appear hereinafter.

For the purpose of illustrating the invention there is shown in the drawings forms which are presently preferred; it being understood, however, that this invention is not limited to the precise arrangements and instrumentalities shown.

Figure 1:
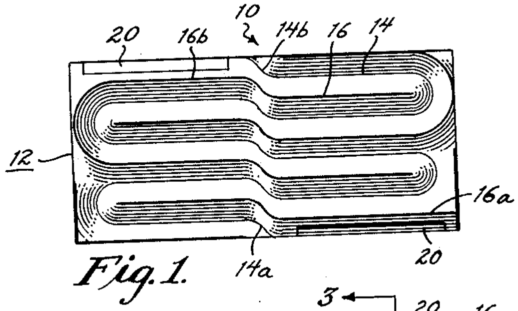
FIGURE 1 is a top elevational view of a base for the resistor of the present invention.
Figure 3:
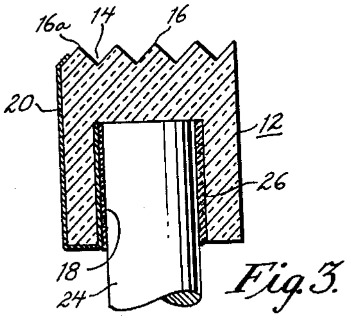
FIGURE 3 is a sectional view taken along line 3—3 of FIGURE 2.
Figure 2:
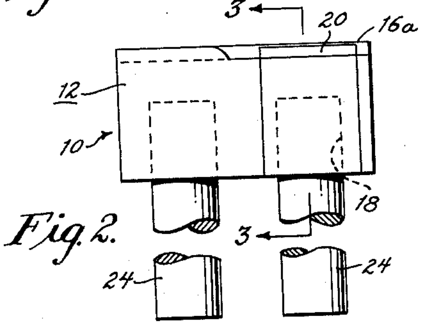
FIGURE 2 is a side elevational view of the base of the resistor of the present invention with the terminals attached thereto.

Referring initially to FIGURES 1–7, the resistor of the present invention is generally designated as 10.

Resistor 10 comprises a substantially rectangular base 12 of a hard, electrical insulating material, such as a ceramic or glass. The top surface of the base 12 is provided with a V-shaped groove 14 which extends back and forth from end-to-end of the base 12 in a continuous, sinuous path. The ends **14*a* and 14*b* of the groove 14 are adjacent opposite sides of the base 12 (see FIGURE 1). Each straight section of the groove 14 is spaced from the adjacent straight sections of the groove 14 by a ridge 16. The base 12 is provided with a pair of spaced, blind holes 18 in the bottom surface of the base 12**.

A separate terminating stripe 20 is coated on the outer side of each of the ridge portions **16*a* and 16*b* just beyond the ends 14*a* and 14*b* of the groove 14. Each of the terminating stripes 20 extends downwardly along the adjacent side of the base 12, along the bottom surface of the base 12 to an adjacent blind hole 18, and then upwardly along a portion of the hole 18 (see FIGURE 3). The terminating stripes 20 are layers of an electrically conductive material, such as gold or silver, which is painted, sprayed or otherwise applied to the base 12**.

Figure 4:
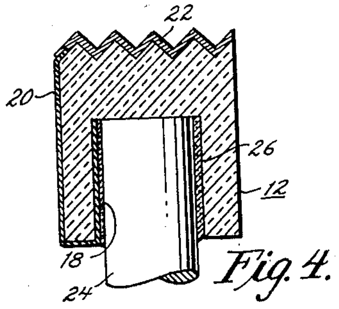
FIGURE 4 is a view similar to FIGURE 3 with the resistance material coated on the base.
Figure 7:
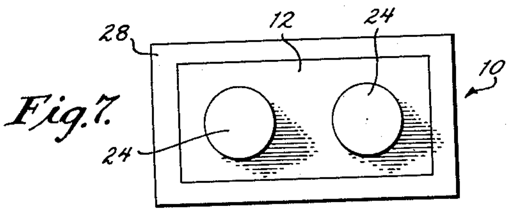
FIGURE 7 is a bottom elevational view of the completed resistor of the present invention.

A layer 22 of an electrical resistance material is coated over the entire top surface of the base 12 (see FIGURE 4). The layer 22 may be of any of the well known type resistance materials, such as carbon or metal particles mixed with a plastic binder, pure carbon, carbon mixed with a metal, or a pure metal or metal alloy. The resistance layer 22 may be applied to the base 12 by either painting, spraying paralytic deposition from a gas or vapor, or by deposition from an evaporated vapor in a vacuum. The resistance layer 22 extends across the portions of both of the terminating strips 20 which are on the ridge portions **16*a* and 16*b*. Thus, the resistance layer 22 is electrically connected to the terminating strips 20**.

A separate terminal wire 24 of an electrical conductive metal is inserted in each of the blind holes 18 in the base 12. The terminal wires 24 are each secured in the holes 18 by a layer of an electrically conductive cement 26 which surrounds the end portion of the terminal wires 24 which are within the holes 18. The conductive cement 26 may be a plastic cement having metallic particles therein, or may be a solder. The conductive cement 26 not only physically secures the teminal wires 24 in the holes 18, but also electrically connects the terminal wires 24 to the terminating strips 20. Thus, the terminal wires 24 are each electrically connected to the resistance layer 22 through the conductive cement 26, and the terminating strip 20. The terminal wires 24 may be secured to the base 12 either before or after the resistance layer 22 is applied to the base 12 according to the manner that the resistance layer 22 is applied to the base 12.

Figure 5:
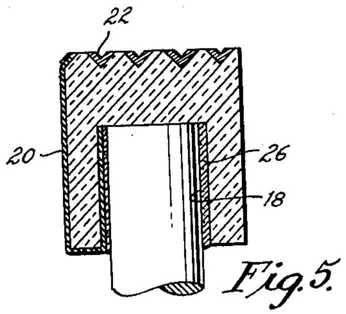
FIGURE 5 is a view similar to FIGURE 4 showing the manner of varying the resistance value of the resistor.

After the resistance layer 22 is applied to the top surface of the base 12, and the terminal wires 24 are secured within the holes 18, the base 12 is placed with its top surface against a lapping or grinding belt or wheel to grind away the tips of the ridges 16 (see FIGURE 5). The grinding away of the tips of the ridges 16 also removes some of the resistance material 22, leaving only the bottom portions of the groove 14 coated with the resistance material 22. Thus the resistance layer 22 follows the sinuous path of the groove 14 to provide an elongated resistance path which has a higher resistance value than the original resistance layer coated on the base 12. Since the groove 14 is V-shaped, the width of the groove 14 becomes narrower as more of the ridges 16 are ground away. Thus, the more of the ridges 16 that are ground away the narrower the width of the resistance material path 20, and the greater the resistance value of the resistor 10. By continuously measuring the resistance value of the resistance path 22 as the ridges 16 are ground away, the grinding can be stopped when a desired resistance value is obtained. Since the terminal wires 24 are electrically connected to opposite ends of the resistance path 22, the resistance value of the resistor 10 can be easily measured by connecting the terminal wires 24 across a resistance meter. Thus, although the area of the top surface of the base 12 may be small, the elongated resistance path 22 coated in the sinuous groove 14 provides a high resistance value, and the resistance value of the resistor 10 can be easily adjusted to obtain a desired resistance value.

Figure 6:
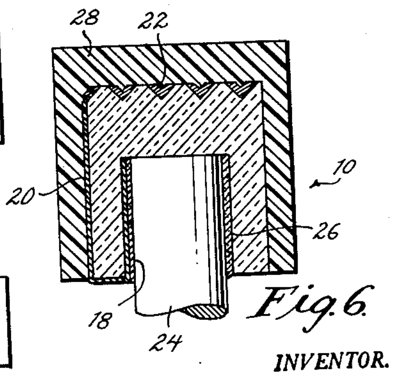
FIGURE 6 is a sectional view similar to FIGURE 5 showing the completed resistor.

After the resistance value of the resistance layer 22 is adjusted to the desired value, a protective jacket 28 of an electrical insulating material can be provided around the base 12, as shown in FIGURE 6. The protective jacket 28 may be coated, molded, or cast around the base 12 and across the resistance layer 22, leaving the terminal wires 24 projecting from the bottom of the base 12. Since the terminal wires 24 extend in the same direction from the base 12, and are parallel, the resistor 10 of the present invention can be easily mounted on a printed circuit board by inserting the terminals 24 through holes in the board.

Figure 8:
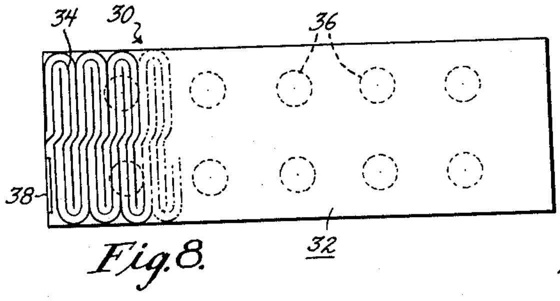
FIGURE 8 is a top elevational view of a modification of the resistor of the present invention.
Figure 9:
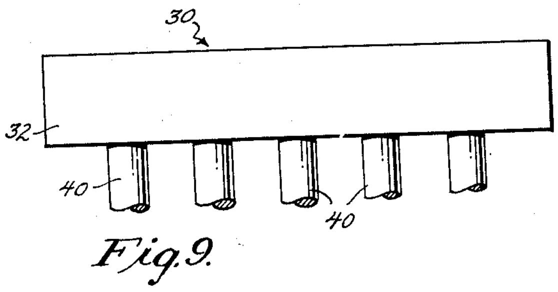
FIGURE 9 is a side elevational view of the modification of the resistor of the present invention.

Referring to FIGURES 8 and 9, a modification of the resistor of the present invention is generally designated as 30.

Resistor 30 comprises a substantially rectangular base 32 of a hard, electrical insulating material, such as a ceramic or glass. The top surface of the base 32 is provided with a V-shaped groove 34 which extends from side-to-side of the base 32 in a continuous, sinuous pattern from one end of the base 32 to the other end of the base. Although the groove 34 is shown as extending only over a portion of the base 32 in FIGURE 8, it should be understood that the groove 34 extends for the entire length of the base 32. The base 32 has a plurality of blind holes 36 in the bottom surface thereof.

Terminating strips 38, only one of which is shown, are coated on the base 32 to extend from adjacent the ends of the groove 34 into adjacent holes 36. Similar terminating strips, not shown, are coated on the base 32 to extend from various points along the groove 34 to other of the holes 36. Terminal wires 40 are secured in the holes 36 by a conductive cement so that the terminal wires 40 are each electrically connected to a terminal strip. The top surface of the base 32 is coated with a resistance material layer similar to the resistance material layer 22 of the resistor 10. The ridges between the straight sections of the groove 34 are then ground off to provide an elongated, sinuous resistance path which extends form one end of the base 32 to the other end of the base. The resistor 30 may be provided with a protective jacket similar to the protective jacket of the resistor 10.

The terminal wires 40 which are electrically connected to the ends of the resistance path through the terminating stripes 38 permit the use of the total resistance value of the resistor 30. However, the other terminal wires 40 are electrically connected through their terminating stripes to various points along the resistance path between the ends of the resistance path. Thus, the resistor 30 will provide many different resistance values according to the two terminal wires 40 which are being used. Although the resistor 30 is shown as having a terminal wire 40 in each of the holes 36, any desired number of the holes 36 can be used according to the number of intermediate taps that are desired.

The present invention may be embodied in other specific forms without departing from the spirit or essential attributes thereof and, accordingly, reference should be made to the appended claims, rather than to the foregoing specification as indicating the scope of the invention.

I claim:

1. An electrical resistor comprising a substantially rectangular base of an electrical insulating material, said base having a sinuous groove in its upper surface, said groove extending from side-to-side of said base with one end of the groove being at one end of the base and the other end of the groove being at the other end of the base, said base having at least three blind holes in its bottom surface, two of said holes being adjacent opposite ends of said base, a layer of an electrical resistance material coated on the surface of said groove to provide an elongated sinuous resistance path, a separate terminal wire of an electrical conducting material secured in and projecting from each of said holes, and means extending along the surface of said base and electrically connecting each of said terminal wires to said resistance path, two of said terminal wires being electrically connected to opposite ends of the resistance path, and the other of said terminal wires being connected to said resistance path between the ends of the resistance path.

2. An electrical resistor in accordance with claim 1 in which the groove in the top surface of the base is V-shaped in transverse cross-section.

3. An electrical resistor in accordance with claim 2 in which the adjacent sections of the groove are spaced apart by a flattened portion of the top surface of the base, and the resistance material is coated on only the sides of the groove.

4. An electrical resistor in accordance with claim 3 in which the means electrically connecting each of the terminal wires to the resistance material path comprises a terminating strip of an electrical conducting material coated on the base and extending from the resistance path into the hole in which the terminal wire is secured, and the terminal wires are secured in the holes by an electrically conductive cement.

5. An electrical resistor comprising a substantially rectangular base of an electrical insulating material, said base having a sinuous groove in its upper surface and a pair of spaced blind holes in its bottom surface, said groove being V-shape in transverse cross-section and extending back and forth across the top surface of the base with the adjacent sections of the groove being spaced apart by a flattened portion of the top surface of the base, a layer of an electrical resistance material coated on the side surfaces of the groove to provide an elongated sinuous resistance path, a pair of termination stripes of an electrical conducting material coated on said base, each of said stripes extending along the surface of said base from a separate end of the resistance path to a separate one of the holes in the bottom of said base, a separate terminal wire of an electrical conducting material in each of said holes in the base and projecting therefrom, and an electrically conducting cement securing the terminal wires in the holes and electrically connecting the terminal wires to the conductive stripes so as to electrically connect each of the terminal wires to a separate end of the resistance path.

References Cited in the file of this patent

UNITED STATES PATENTS

| | | |
|---|---|---|
| 1,767,715 | Stoekle | June 24, 1930 |

| | | |
|---|---|---|
| 2,711,463 | Goeppinger et al. | June 21, 1955 |
| 2,711,464 | Anderson et al. | June 21, 1955 |
| 2,742,551 | Kohring | Apr. 17, 1956 |
| 2,775,673 | Johnson | Dec. 25, 1956 |
| 2,777,039 | Thias | Jan. 8, 1957 |
| 2,818,354 | Pritikin et al. | Dec. 31, 1957 |